United States Patent
Knoer et al.

(10) Patent No.: US 11,078,410 B2
(45) Date of Patent: *Aug. 3, 2021

(54) MODIFIED REACTIVE RESIN COMPOSITIONS AND USE THEREOF FOR COATING PROPPING AGENTS

(71) Applicant: Wacker Chemie AG, Munich (DE)

(72) Inventors: Sebastian Knoer, Emmerting (DE); Daniel Calimente, Saline, MI (US); Arndt Schlosser, Stammham (DE)

(73) Assignee: Wacker Chemie AG, Munich (DE)

( * ) Notice: Subject to any disclaimer, the term of this patent is extended or adjusted under 35 U.S.C. 154(b) by 163 days.

This patent is subject to a terminal disclaimer.

(21) Appl. No.: 16/071,991

(22) PCT Filed: Jan. 23, 2017

(86) PCT No.: PCT/EP2017/051337
§ 371 (c)(1),
(2) Date: Jul. 23, 2018

(87) PCT Pub. No.: WO2017/129529
PCT Pub. Date: Aug. 3, 2017

(65) Prior Publication Data
US 2019/0023980 A1   Jan. 24, 2019

Related U.S. Application Data

(63) Continuation-in-part of application No. PCT/EP2016/051792, filed on Jan. 28, 2016.

(51) Int. Cl.
| | |
|---|---|
| *C09K 8/80* | (2006.01) |
| *C08L 61/06* | (2006.01) |
| *C08L 83/12* | (2006.01) |
| *E21B 43/267* | (2006.01) |
| *C09K 8/62* | (2006.01) |
| *C08G 77/14* | (2006.01) |
| *C08G 77/46* | (2006.01) |
| *C08G 77/445* | (2006.01) |
| *C08L 83/06* | (2006.01) |

(52) U.S. Cl.
CPC .............. *C09K 8/805* (2013.01); *C08L 61/06* (2013.01); *C09K 8/62* (2013.01); *E21B 43/267* (2013.01); *C08G 77/14* (2013.01); *C08G 77/445* (2013.01); *C08G 77/46* (2013.01); *C08L 83/06* (2013.01); *C08L 83/12* (2013.01)

(58) Field of Classification Search
CPC .................................................... C09K 8/805
See application file for complete search history.

(56) References Cited

U.S. PATENT DOCUMENTS

| | | |
|---|---|---|
| 3,911,045 A | 10/1975 | Erich |
| 4,732,920 A | 3/1988 | Graham |
| 5,422,183 A | 6/1995 | Sinclair |
| 5,516,858 A | 5/1996 | Morita |
| 5,736,619 A * | 4/1998 | Kane ............... C08G 77/42 525/393 |
| 6,342,303 B1 | 1/2002 | Dopico |
| 8,507,618 B2 | 8/2013 | Schäfer |
| 8,852,682 B2 | 10/2014 | Sinclair |
| 9,434,874 B2 | 9/2016 | Qin et al. |
| 2007/0036977 A1 | 2/2007 | Sinclair |
| 2011/0218137 A1 | 9/2011 | Rautschek et al. |
| 2012/0088699 A1 | 4/2012 | Qin |
| 2012/0135894 A1 | 5/2012 | McDaniel et al. |
| 2013/0081812 A1 | 4/2013 | Green et al. |
| 2014/0124200 A1* | 5/2014 | Fournier ............... C09K 8/62 166/280.2 |
| 2014/0275373 A1 | 9/2014 | Bauer |
| 2015/0322335 A1 | 11/2015 | Lawrence |
| 2019/0023980 A1 | 1/2019 | Knoer et al. |

FOREIGN PATENT DOCUMENTS

| | | | |
|---|---|---|---|
| JP | 63046238 A | | 2/1988 |
| JP | 05-043777 A | * | 2/1993 |
| JP | 5043777 A | | 2/1993 |
| JP | 10081748 A | | 3/1998 |
| JP | 2009269999 A | * | 11/2009 |
| JP | 2013545828 A | | 12/2013 |
| WO | 08088449 A2 | | 7/2008 |
| WO | 10060861 A1 | | 6/2010 |

OTHER PUBLICATIONS

Machine translation of JP 5-43777 (no date).*
Wacker Technical Data Sheet for Silres SY 231 Version 1.2, Nov. 6, 2014.
Wacker Technical Data Sheet for Silres HP 2000 Version 1.2, Nov. 6, 2014.
Könczöl L., et al., Ultimate Properties of Epoxy Resins Modified with a Polysiloxane-Polycaprolactone Block Copolymer, Journal of Applied Polymer Science, 54 (1994), pp. 815-826.
Li Zhongatao, High fracture toughness and high modules silicone resins, M.I.T. Thesis, 2000 published: http://hdl.handle.net/1721.1/8301.
Related U.S. Appl. No. 16/070,653, filed Jul. 17, 2018, "Modified Reactive Resin Compositions and Use Thereof for Coating Propping Agent".

* cited by examiner

*Primary Examiner* — Marc S Zimmer
(74) *Attorney, Agent, or Firm* — Brooks Kushman P.C.

(57) ABSTRACT

Coated proppants useful in fracking operations in oil and gas production are coated with a novolac resin containing a linear or cyclic organopolysiloxane of specific composition. The coatings are more fracture resistant, thus producing less fines during use, resulting in longer production campaigns.

7 Claims, No Drawings

MODIFIED REACTIVE RESIN COMPOSITIONS AND USE THEREOF FOR COATING PROPPING AGENTS

CROSS REFERENCE TO RELATED APPLICATIONS

This application is the U.S. National Phase of PCT Appln. No. PCT/EP2017/051337 filed Jan. 23, 2017, which claims priority to PCT/EP2016/051792 filed Jan. 28, 2016, the disclosures of which are incorporated in their entirety by reference herein.

BACKGROUND OF THE INVENTION

1. Field of the Invention

The present invention relates to modified reactive resin compositions and to the use thereof as coating compositions for proppant materials that are used in hydraulic fracturing ("fracking").

2. Description of the Related Art

The fracking method is used in mineral oil and natural gas production and is a method of generating, widening and stabilizing cracks in the rock of a deposit deep underground, with the aim of increasing the permeability of the deposit. As a result, gases or liquids present therein can flow in an easier and more stable manner to the well and be "produced."

The cracks generated have to be kept open with proppants. The coated or uncoated proppants currently available are brittle and do not have the necessary compressive strength for production at high depths. The fracturing of the proppants under the high pressure in the formation releases fine particles that block the cracks and reduce the oil or gas production rate.

The coated proppants available according to the prior art have improved stability compared to the uncoated proppants. However, the effect of the coating, for example one formed from organic resins, is limited by the fact that the available coatings themselves are very brittle and likewise have a tendency to fracture or flake off.

WO2008088449 A2 discloses a means of reducing the brittleness of the coatings of such particles, wherein thermally curing reactive resins, for example epoxy resins, are admixed with block copolymers and adhesion promoters in order thus to achieve an improvement in the impact resistance of the coating. In addition to the use of two additives, it is an additional disadvantage that the toughness improver is a costly block copolymer which is difficult to prepare.

US2012088699A proposes coating particles with at least two oleophilic and hydrophobic resins, for example epoxy resins and silicone resins. The particles thus coated improve the oil yield and reduce the amount of water produced. The use of silicone resins makes these particles costly.

U.S. Pat. No. 8,852,682B2 discloses particles for use as proppant materials which have multiple partial coats interleafed together. A filler is explicitly metered in during the individual process steps. A disadvantage is the complex process. Various resins are used for coating, for example phenolic resins containing fumed silicas as reinforcing fillers.

U.S. Pat. No. 5,422,183A discloses particles for use as proppant materials in fracking methods which likewise have a two-layer coating composed of resins. Phenolic resins, for example, are used for coating, wherein fumed silicas are likewise used as filler. This filler is introduced into the interphase of the individual layers after the first coating step. A disadvantage in both documents is the very complex multistage process which is costly and additionally difficult to control.

US20140124200A discloses the use of hybrid materials produced by chemical bonding of organic resins and silicone resins for coating of proppant materials. Disadvantages here are the use of costly silicone resins, and additional complex process for chemical modification, and the difficulty of controlling product quality in the case of reaction of two branched polymers.

In addition, it is common knowledge in the prior art of processes that lead to a reduction in the brittleness of coatings that use a reactive resin which in itself already has comparatively low brittleness, for example epoxy resins. WO2010060861A1 describes, for example, a homogeneous reaction resin which shows an improvement in the chemical properties of fracture toughness and impact resistance as a cured thermoset. In this case, for example, at least one organopolysiloxane is homogeneously distributed in an unhardened epoxy resin with the aid of a silicone organocopolymer which serves as dispersant. Similarly, Könczöl L. et al. (KONCZOl L. et al; ISSN: 2021-8995; DOI: 10.1002/APP.1994.070540612) teach the use of polysiloxane-polycaprolactone block copolymers for modification of toughness of epoxy resins.

However, the prior art teaches that this extrinsic modification of toughness only works when the reactive resin as such has a certain intrinsic toughness, as is the case for epoxy resins. This method is unsuitable for very brittle, vitreous reactive resins (Li Zhongatao; doctoral thesis from the year 2000, entitled: "High fracture toughness and high modules silicone resins" published at http://hdl.handle.net/1721.1/8301).

SUMMARY OF THE INVENTION

It was therefore an object of the present invention to provide a suitable process for modifying the toughness of the very brittle phenolic resins and melamine reactive resins and to provide inexpensive coating compositions for proppants, a process for coating proppants and the coated proppants. These proppants, after coating and curing, should have the necessary hardness and compressive strength and simultaneously show elastic properties, in order that there is no fracturing or flaking-off of the coating. These and other objects are surprisingly achieved by the modified reactive resin compositions of the invention, wherein the reactive resin compositions comprise A) 80%-99.8% by weight of at least one reactive resin selected from phenolic resins and melamine resins, and
(B) 0.2%-20% by weight of at least one linear or cyclic organopolysiloxane, with the proviso that (B) has at least 3 successive Si—O units
(B) has at least one Si—C-bonded pendant or terminal organic $R^1$ radical, where $R^1$ contains at least 4 atoms selected from the group of C, N, P, O and S, and at least 2 of these atoms in $R^1$ have to be a C, and
in (B) the ratio of the sum total of all carbon atoms to the sum total of all silicon atoms is at least 2.05, and
(B) is in free-flowing form at 20° C., or can be melted by heating within a temperature range up to 250° C. and hence can be converted to a free-flowing form.

DETAILED DESCRIPTION OF THE PREFERRED EMBODIMENTS

Preferably, the critical stress intensity factor, i.e. the K1c value, of the reactive resin composition of the invention is at least 0.55 MN/m$^{3/2}$, more preferably at least 0.6 MN/m$^{3/2}$, and most preferably at least 0.75 MN/m$^{3/2}$.

The K1c value is determined according to ASTM D 5045 on compact tensile specimens (CT test specimens) with W=35 mm and a strain rate of 1 mm/min. The CT test specimens with thickness 4.5 mm were produced by means of a CNC lathe and inscribed to 3 mm with a blade.

The Tg (glass transition temperature) of the reactive resin composition of the invention is preferably in the range of 0° C. to 250° C., more preferably in the range of 50° C. to 230° C., and most especially preferably in the range of 80° C. to 180° C.

The Tg is determined by means of DMTA (dynamic-mechanical thermal analysis) in torsion. The Tg value is defined here as the maximum of tan delta.

Measurement Conditions:
instrument: ARES rheometer (TA Instruments)
temperature range: 25° C.-360° C.
heating rate: 4 K/min
frequency: 1 Hz Samples with the following dimensions were analyzed: width: about 6 mm, thickness: about 3 mm, length: about 40 mm (resulting clamped length: about 27 mm).

Component (A)

Preferably, the reactive resin composition of the invention comprises just one reactive resin (A).

The reactive resins (A) must form a firm, non-tacky coating at ambient temperatures. This is necessary in order that the coated particles remain free-flowing, such that they do not agglomerate under normal storage conditions. The coating can essentially be cured such that little or no crosslinking takes place under conditions within the borehole. The coating may also be only partly cured or provided with other reactive groups, such that covalent crosslinking takes place under the conditions in the borehole.

Suitable reactive resins (A) in accordance with the invention are all phenolic resins and melamine resins provided with a sufficient number of reactive groups suitable for a hardening reaction.

The reactive resins (A) that crosslink by polycondensation are preferably the condensation products of aldehydes, e.g. formaldehyde, with melamine or with phenol. The hardening usually takes place here via increasing temperature with elimination of water.

Not only the aforementioned reactive resins (A), but also all others suitable for production of thermosets can be modified in the manner proposed in accordance with the invention and, after crosslinking and hardening, result in thermosets having considerably improved fracture and impact resistance, with retention of other essential properties characteristic of thermosets, such as strength, heat distortion resistance and chemical resistance, in an essentially unchanged manner.

The preferred reactive resins (A) are the phenol-formaldehyde resins. These reactive resins (A) include heat-curing phenol resins of the resol type and phenol-novolak resins, which can be rendered thermally reactive by addition of catalyst and formaldehyde. The reactive resins (A) can either be fully cured during the coating of the proppant particles or only partly cured. Proppants having an only partly hardened coating do not cure until they have been introduced into deeper strata during fracking.

Particularly preferred reactive resins (A) are phenol-novolak resins. These are obtainable, for example, from Plastics Engineering Company, Sheboygan, USA, under the trade name Resin 14772. If such a reactive resin is used, it is necessary to add a crosslinking agent (C) to the mixture in order to bring about the subsequent curing of the reactive resin. Hexamethylene-tetramine is the preferred material as (C) for this function, since it serves both as catalyst and as formaldehyde source.

(A) is used in amounts of at least 80% by weight, preferably at least 88% by weight, and more preferably at least 94% by weight and in amounts of at most 99.8% by weight and preferably at most 99.5% by weight.

Component (B)

Preferably, the reactive resin composition of the invention comprises just one organopolysiloxane (B).

(B) preferably has at least 5, more preferably at least 10, successive Si—O— units.

The ratio of the sum total of the carbon atoms to the sum total of the silicon atoms in (B) is at least 2.05, preferably at least 2.1 and more preferably at least 3, and preferably at most 40, more preferably at most 20, and most preferably at most 10.

Linear or cyclic (B) may have minor degree of branching or a minor degree or bridging by an organic radical. The average number of bridging or branching sites per molecule is preferably ≤4, more preferably ≤2, yet more preferably ≤1, and most preferably <1.

(B) is preferably a linear polyorganosiloxane.

The average number of silicon atoms per molecule of (B) is preferably less than 1000, more preferably less than 200, and especially less than 100.

(B) is used in amounts of at least 0.2% by weight and at most 20% by weight, preferably at least 0.5% by weight and at most 12% by weight and most preferably at most 6% by weight.

It is a further important property of (B) that it is in free-flowing form at 20° C., or is meltable by heating within a temperature range up to 250° C. and can thus be converted to a free-flowing form.

Definition of "Free-Flowing Form" for (B):

100 g of (B) are distributed over a 10 cm$^2$ area of a sieve having mesh size 1 mm. Within 72 h, the significant proportion of the material, i.e. at least 90%, flows through the sieve. The material of (B) above the sieve meshes which can be stripped off with a spatula is considered to be residue which has not run through the sieve. This residue is weighed in order to determine whether (B) is free-flowing.

"Free-flowing" in connection with (A) and the reactive resin composition means that these are in a physical state of matter that enables distribution over the surface of the proppant (having been rendered free-flowing by prior heating up to 250° C. or dissolved in a suitable solvent).

The organic R$^1$ radical has at least 4 atoms, preferably at least 6 atoms and more preferably at least 7 atoms selected from the group of C, N, P, O and S, and
at least 2 of these atoms are C and preferably at least 3 of these atoms are C.

Examples of unsubstituted R$^1$ radicals are alkyl radicals such as the n-butyl, isobutyl, tert-butyl, n-pentyl, isopentyl, neopentyl, and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical, octadecyl radicals such as the n-octadecyl radical;

alkenyl radicals, cycloalkyl radicals such as cyclopentyl, cyclohexyl, cycloheptyl and methylcyclohexyl radicals; aryl radicals such as the phenyl, naphthyl, anthryl and phenanthryl radicals; alkaryl radicals such as the o-, m-, and p-tolyl radicals, xylyl radicals and ethylphenyl radicals; aralkyl radicals such as the benzyl radical and the alpha- and β-phenylethyl radicals.

Preferred unsubstituted $R^1$ are the following radicals: phenyl, α-phenylethyl, n-octyl, n-dodecyl, n-hexadecyl, n-octadecyl.

Examples of substituted $R^1$ radicals are haloalkyl radicals such as the perfluorohexylethyl radical; haloaryl radicals, such as the o-, m- and p-chlorophenyl radicals, and all the unsubstituted radicals mentioned above for $R^1$ which are substituted by the following groups: mercapto groups, epoxy-functional groups, carboxyl groups, keto groups, enamine groups, amino groups, aminoethylamino groups, isocyanato groups, aryloxy groups, acryloyloxy groups, methacryloyloxy groups, hydroxyl groups and halogen groups.

A preferred substituted $R^1$ is the 10-carboxydecyl radical.

Further examples of substituted $R^1$ radicals are short alkyl radicals, such as the methyl, ethyl, n-propyl, and isopropyl radicals, and alkenyl radicals such as the vinyl and allyl radicals, which are preferably substituted by mercapto groups, enamine groups, amino groups, aminoethylamino groups, isocyanato groups, aryloxy groups, acryloyloxy groups, methacryloyloxy groups, hydroxyl groups and halogen groups, with the proviso that the substituted $R^1$ radicals contain at least 4 atoms selected from the group of C, N, P, O and S, where at least two carbon atoms may be present.

Preferred substituted $R^1$ radicals are hydroxypropyl and mercaptopropyl.

Further preferred substituted $R^1$ radicals are epoxy radicals of the formula

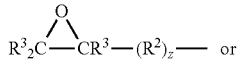 (VI)

or

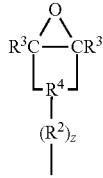 (VII)

where
$R^2$ is a divalent hydrocarbyl radical which has 1 to 10 carbon atoms per radical and may be interrupted by an ether oxygen atom,
$R^3$ is a hydrogen atom or a monovalent hydrocarbyl radical which has 1 to 10 carbon atoms per radical and may be interrupted by an ether oxygen atom,
$R^4$ is a trivalent hydrocarbyl radical having 3 to 12 carbon atoms per radical, and
z is 0 or 1.

Examples of such $R^1$ radicals are
glycidoxypropyl,
3,4-epoxycyclohexylethyl,
2-(3,4-epoxy-4-methylcyclohexyl)-2-methylethyl,
3,4-epoxybutyl,
5,6-epoxyhexyl,
7,8-epoxydecyl,
11,12-epoxydodecyl, and
13,14-epoxytetradecyl radicals.

Preferred epoxy radicals are the glycidoxypropyl radical and the 3,4-epoxycyclohexylethyl radical.

Further preferred substituted $R^1$ radicals are amino radicals of the general formula

 (VIII)

where $R^6$ is a divalent linear or branched hydrocarbyl radical having 3 to 18 carbon atoms, preferably an alkylene radical having 3 to 10 carbon atoms,
$R^7$ is a hydrogen atom, an alkyl radical having 1 to 8 carbon atoms or an acyl radical such as the acetyl radical, preferably a hydrogen atom,
$R^8$ is a divalent hydrocarbyl radical having 1 to 6 carbon atoms, preferably an alkylene radical having 1 to 6 carbon atoms,
n is 0, 1, 2, 3 or 4, preferably 0 or 1.

Further preferred substituted $R^1$ radicals are polyether radicals of the general formula

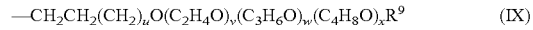 (IX)

where
$R^9$ is a hydrocarbyl radical having 1 to 6 carbon atoms or H, preferably Me or H,
u 0 or an integer from 1 to 16, preferably 1 to 4,
v 0 or an integer from 1 to 35, preferably 1 to 25, and
w 0 or an integer from 1 to 35, preferably 1 to 25,
x 0 or an integer from 1 to 35, preferably 1 to 25,
with the proviso that the sum total of v+w+x is 1 to 70, preferably 1 to 50.

Further preferred substituted $R^1$ radicals are organic polymer radicals with formation of a polysiloxane-containing copolymer. These copolymers may be block copolymers or graft copolymers. Examples of suitable organic moieties are, but are not limited to, polycaprolactone, polyesters, polyvinyl acetates, polystyrenes, polymethylmethacrylates. The organic moiety is preferably a (co)polymer of vinyl acetate, methyl methacrylate or aliphatic polyester. It is more preferably polycaprolactone.

The block copolymers contain a siloxane unit having a molecular weight of 1000-10,000 g/mol, preferably 1500-5000 g/mol, and more preferably 2000-4000 g/mol.

Particularly preferred $R^1$ radicals are polyether radicals, epoxy radicals, especially the glycidoxypropyl radical and the 3,4-epoxycyclohexylethyl radical, and organic polymer radicals, especially a polycaprolactone radical.

The present invention further provides a process for producing the reactive resin composition.

In one embodiment, this is effected by dispersing (B) in (A) which is free-flowing at 20° C. or in (A) which has been rendered free-flowing by prior heating up to 250° C. or in (A) which has been dissolved in a suitable solvent. The person skilled in the art will be aware of the way in which (A) can be converted to free-flowing form without causing hardening. If a solvent has been used, it can be evaporated thereafter. Suitable solvents are known to those skilled in the art and are selected depending on the reactive resin (A). In the case of phenolic resins, suitable solvents are, for example, ethyl acetate and acetone. Which solvents are suitable for which reactive resins is described, for example, in the following textbook: Polymer Handbook, Volume 2, 4th ed.; J. Brandrup, E. H. Immergut, E. A. Grulke; John Wiley & Sons, Inc., 1999 (ISBN 0-471-48172-6).

Suitable mixers are, for example, laboratory mixers, planetary mixers, dissolvers, rotor-stator systems, or else extruders, rolls, 3-roll mills, etc.

In the dispersing operation, (B) can dissolve entirely or partly in (A). Undissolved fractions are present in dispersed form as a second phase in (A). The average size of these domains is preferably less than 50 µm, more preferably less than 20 µm, yet more preferably less than 10 µm, and most preferably less than 1 µm.

The present invention further provides for the use of the reactive resin composition of the invention for coatings and for production of moldings, workpieces and foams. More particularly, the reactive resin composition of the invention is used for coating of proppants.

The present invention further provides a process for producing proppants coated in accordance with the invention.

One skilled in the art will be aware of various ways of coating proppants with resins from the prior art. These processes can also be used for the coating of proppants with the present reactive resin compositions of the invention.

In order to make maximum use of the advantageous effect of the coating, it is important to ensure particularly good dispersion of (A) with (B). In the embodiment preferred for this purpose, the reactive resin composition of the invention, in free-flowing form—i.e. already free-flowing at 20° C. or melted by heating to 250° C. and therefore free-flowing or dissolved in a suitable solvent and therefore free-flowing— is applied to the proppant, for example by spraying or mixing, together with or without at least one hardener (C) and with or without at least one additive (D), and then cured.

In a particularly preferred embodiment, the reactive resin composition of the invention is melted by heating to 250° C. and therefore applied in free-flowing form to the proppant, for example by spraying or mixing, together with or without at least one hardener (C) and with or without at least one additive (D), and then cured.

The statements made previously are applicable to the solvents.

If, by contrast, economic advantages are more important or maximum flexibility in the process for production of the coated proppants is advantageous, the alternative production process which follows is used. The first step can also be referred to as an in situ method for the production of the reactive resin composition of the invention, since it is effected in the presence of the proppant. In this production process, (B) is mixed together with (A) which is free-flowing at 20° C. or with (A) which has been rendered free-flowing by prior heating up to 250° C. or with (A) which has been dissolved in a suitable solvent, and the proppant, optionally with addition of hardener (C) and optionally further additives (D), and hardened. The sequence of addition of components (A), (B), (C) and (D) is variable here, with the proviso that component (B) is mixed in before any substantial hardening of the reactive resin occurs. This has the advantage that adjustment of the ratios of (A) to (B) can be effected at short notice at any time in a simple and uncomplicated manner.

This process for producing coated proppants is thus characterized in that
i) the reactive resin composition is produced in situ by mixing least one (B) with at least one (A) which is free-flowing at 20° C. or with (A) which has been rendered free-flowing by prior heating up to 250° C. or with (A) which has been dissolved in a suitable solvent and at least one proppant and with or without at least one hardener (C) and with or without at least one additive (D), and
ii) only thereafter is curing effected.

In a further alternative production process for proppants coated in accordance with the invention, (A) is mixed with a suitable solvent, proppant and (B). It is optionally possible to add hardener (C) and possibly further additives (D) to the mixture. Subsequently, the solvent is evaporated off and the proppants thus coated are hardened. The sequence of addition of components (A), (B), (C) and (D) is variable.

In a particularly preferred possible embodiment, a suitable proppant, for example sand, is preheated to about 170-260° C. In a mixer, the reactive resin composition of the invention, a suitable hardener (C) and optionally various additives (D) are then added.

In another alternative, a suitable proppant, for example sand, is preheated to about 170-260° C. In a mixer, (A), (B), a suitable hardener (C) and optionally various additives (D) are then added.

The production of layers should be understood as follows: multiple layers are produced in multiple successive coating and hardening cycles. In other words, after the wetting of the surface of the problems with the reactive resin composition of the invention, this layer is at first partly or fully hardened. Subsequently, a new layer of the reactive resin composition of the invention is applied and again partly or fully hardened.

This contrasts with the application of the reactive resin composition of the invention in portions in multiple steps without any substantial intermediate hardening of the individual portions, and only at the end is there partial or complete hardening. Thus, this leads only to a single layer.

Proppants

Suitable proppants have long been known to one skilled in the art from the prior art and can be used for coating by the invention. Proppants are typically hard particles of high-strength, for example sand or gravel composed of rocks such as limestone, marble, dolomite, granite etc., but also glass beads, ceramic particles, ceramic spheres and the like, this list being illustrative and nonlimiting. Preferably, the proppant particles exhibit an essentially spherical, i.e. ball-shaped form, since these leave sufficient interspace in order that the crude oil or gas can flow past. Therefore, coarse-grain sand, glass beads and hollow glass spheres (called microballoons) are preferred as proppants. Particular preference is given to using sand as the proppant particle. Preferably, the proppant particles have an average size of 5000 to 50 µm, more preferably an average size of 1500 to 100 µm. In addition, they preferably have a side ratio of length to width of not more than 2:1.

Hardeners (C)

Suitable hardeners have long been known to those skilled in the art from the prior art and are selected in accordance with the reactive resin used. A preferred hardener (C) for novolaks is urotropin. The hardener (C), and hence also urotropine, is typically used in amounts between 8% and 20% by weight, based on the amount of reactive resin composition of the invention. Preferably, urotropin is applied to the melt of the reactive resin as an aqueous solution. Methods of this kind are likewise known to one skilled in the art and are described, for example, in U.S. Pat. No. 4,732,920.

Additive (D)

Suitable additives (D) have likewise long been known to one skilled in the art from the prior art. Non-exclusive examples are antistats, separating agents, adhesion promoters, etc.

Suitable proppants, hardeners (C) and additives (D) are described, for example, in U.S. Pat. No. 4,732,920 and US2007/0036977 A1.

For optimal performance of the proppant coated in accordance with the invention, the type of proppant, type and characteristics of the reactive resin (A), organopolysiloxane (B), hardener (C) and any additives (D), the type of mixing and coating process, the sequence of addition of the components and the mixing times have to be matched to one another according to the requirement of the specific application. Any change in the proppant, under some circumstances, requires adjustment of the coating process and/or the hardeners (C) and additives (D) used.

The present invention thus also further provides the coated proppants that have been coated in accordance with the invention and are obtainable by the process described above.

In the proppants of the invention, the surface of the proppant may have been wholly or partly coated. Preferably, on examination by scanning electron microscope, at least 20% of the visible surface of the proppant has been coated with the reactive resin composition of the invention, more preferably at least 50%.

Preferably, on examination by scanning electron microscope, at least 5% of the proppant particles are fully coated on their visible side, more preferably at least 10%.

The major portion of the coating on the proppant of the invention is 0.1 to 100 µm thick, preferably 0.1 to 30 µm, more preferably 1 to 20 µm.

Preferably, the proppants of the invention have been coated with fewer than three layers of the reactive resin composition of the invention, more preferably with just one layer.

The reactive resin composition of the invention is preferably used in amounts of 0.1-20% by weight, based on the weight of the proppant, preferably of 0.5-10% by weight and most preferably of 1-5% by weight.

The present invention further provides for the use of the proppants coated in accordance with the invention in fracking production methods for mineral oil and natural gas.

The reactive resin composition of the invention has improved leveling properties in coating processes. As a result, surfaces are coated more uniformly. It is possible to obtain smoother and shinier surfaces.

The reactive resin compositions of the invention show advantages in coating of proppants in that the level of reject material resulting from sticking of the proppant is noticeably reduced.

The hardened reactive resin composition of the invention has improved toughness, elasticity and formability at the same hardness. As a result, it is more resistant to stresses such as impacts, deformation or pressure and has a lower tendency to fracture.

The reactive resin composition of the invention, as a hardened coating on the proppants, has improved fracture resistance, toughness and elasticity. The coating has a reduced tendency to fracture and flake off and protects the proppant more effectively and for a longer period of time against high pressures and impacts. Thus, the stability of the overall proppant is improved.

Conventional proppants according to prior art are very brittle and have a high tendency to fracture. Fracture of the proppant results in release of fines. Release of fines has an adverse effect on the rate at which the crude oil or natural gas flows through in that the interstices between the proppant grains are blocked. This quickly makes the oil or gas source unviable. New wells or refracking become necessary.

By contrast, the proppants coated in accordance with the invention are more resistant to stresses such as impacts, the formation of pressure and thus have a lower tendency to fracture.

A further advantage of the coating of the invention lies in its formability, such that it frequently does not itself fracture on fracturing of the brittle proppant grains and thus encases or retains the resultant fines like a plastic shell and hence overall reduces the release thereof.

These advantageous properties of the proppants coated in accordance with the invention allow oil or gas flow to be maintained for longer periods of time. This gives rise to the crucial economic advantages and also advantages in environmental protection.

EXAMPLES

The examples which follow elucidate the invention without having any limiting effect. In the examples described hereinafter, all figures given for parts and percentages, unless stated otherwise, are based on weight. Unless stated otherwise, the examples which follow are conducted at a pressure of the surrounding atmosphere, i.e. at about 1000 hPa, and at room temperature, i.e. at 25° C., or at a temperature which is established on combination of the reactants at room temperature without additional heating or cooling. All viscosity figures hereinafter relate to a temperature of 25° C.

Abbreviations Used

The meanings of the abbreviations used previously also apply to the examples:
PTFE=polytetrafluoroethylene
rpm=revolutions per minute Example 1

A glass flask was purged with nitrogen, charged with 475 g of novolak "Resin 14772" (Plastics Engineering Company, Sheboygan, USA) and purged with nitrogen once again. The material was melted at 120° C. Then a stirrer was switched on at 420 rpm. 25 g of WACKER®WAX OH 350 D-RO (a linear polysiloxane-polycaprolactone block copolymer with melting point 50° C. and about 30-50 Si—O units) were added and the mixture was stirred at 420 rpm, 10 minutes. The liquid material is poured hot onto a PTFE film and mechanically comminuted, and hence a granular material is produced.

Example 2

By the process of example 1, 25 g of SIPELL® RE 63 F (from Wacker Chemie AG, a polydimethylsiloxane with glycidoxypropylmethylsiloxy units and about 100-160 Si—O units; dynamic viscosity at 25° C. about 300 mPas) rather than WACKER®WAX OH 350 D-RO were incorporated and a granular material was produced.

Example 3

By the process of example 1, 25 g of silicone oil 1 (a trimethylsiloxy end-capped polydimethylsiloxane having about 75-85 Si—O units, consisting of dimethylsiloxy units and an average of 2.5 glycidoxypropylmethylsiloxy units and an average of 2.5 (hydroxy(polyethyleneoxy) (polypropyleneoxy)propyl)-methylsiloxy units per molecule; dynamic viscosity at 23° C., Brookfield, 2300-2500 mPa·s) rather than WACKER®WAX OH 350 D-RO were incorporated and a granular material was produced.

Example 4

By the process of example 1, 25 g of silicone oil 2 (an α,ω-functional silicone oil having about 15-20 Si—O units and terminal hydroxy(polyethyleneoxy) groups with about 10 repeated ethylene oxide units; dynamic viscosity at 25° C., Brookfield, 150-300 mPa·s) rather than WACKER®WAX OH 350 D-RO, and a granular material was produced.

Example 5

A glass flask was purged with nitrogen, charged with 475 g of novolak "Resin 14772" (Plastics Engineering Company, Sheboygan, USA) and purged once again with nitrogen. The material was melted at 120° C. Then a stirrer was switched on at 420 rpm. 12.5 g of WACKER®WAX OH 350 D-RO were added and the mixture was stirred at 420 rpm for 5 minutes. Thereafter, 12.5 g of WACKER® AK 100 SILICONOEL, a non-functional, trimethylsiloxy end-capped polydimethylsiloxane, were added and the mixture was stirred for a further 10 minutes. The liquid material is poured hot onto a PTFE film and mechanically comminuted.

Comparative Example 1 (V1)

By the process of example 1, 25 g of WACKER® AK 100 SILICONOEL, a non-functional, trimethylsiloxy end-capped polydimethylsiloxane, rather than WACKER®WAX OH 350 D-RO are incorporated.

It was found that, unexpectedly, the organopolysiloxanes (B) of the invention are distributed uniformly and finely in the reactive resin. If a second phase is formed, it is essentially in the form of spherical droplets. The noninventive polysiloxane from comparative example V1 is not homogeneously dispersed and forms inhomogeneously distributed streaks in the reactive resin.

Comparative Example 2 (V2)

Comparative example V2 was unmodified novolak "Resin 14772" (Plastics Engineering Company, Sheboygan, USA).

Example 6

Preparation of Reactive Resin Solutions for Production of Test Specimens and Coating of Q-PANEL Test Sheets:

10 parts in each case of the inventive modified phenol resins from examples 1-5 or 10 parts of the noninventive modified phenol resin from comparative example V1 or 10 parts of the pure modified phenol Resin 14772 (Plastics Engineering Company, Sheboygan, USA) were dissolved in each case together with 1 part urotropin and 10.0 parts ethyl acetate (from Bernd Kraft, >=99%) by agitation overnight.

Example 7

Production of Test Specimens for Determination of K1c and Tg:

The solutions from example 6 are poured into an aluminum mold to a height of 12 mm and heated from 40° C. to 120° C. over the course of 8 days. This is followed by heating for 2 h each at 120° C., 140° C. and 160° C. and homogeneous cooling overnight. Hard brown test specimens of thickness about 6 mm are obtained.

Table 1 shows the comparative data of the modified phenol-novolak resins.

TABLE 1

| Example | Siloxane additive | Amount % | C/Si ratio | K1c $MN/m^{3/2}$ | Tg °C. | Phase distribution of siloxane additive Average size of second phase (approx. μm) |
|---|---|---|---|---|---|---|
| 1 | WACKER ® WAX OH 350 D-RO | 5 | 6 | 0.9 | 116.3 | 0.005-0.020 |
| 2 | SIPELL ® RE 63 F | 5 | 2.12 | n/a | n/a | 0.5-8 |
| 3 | Silicone oil 1 | 5 | 5 | 0.8 | 106.9 | 0.005-0.020 |
| 4 | Silicone oil 2 | 5 | 4.5 | n/a | 111.7 | Complete dissolution |
| 5 | WACKER ® WAX OH 350 D-RO WACKER ® AK 100 SILICONOEL | 2.5 2.5 | 6 2.03 | 0.85 | 113.5 | 0.05-0.6 |
| V1 | WACKER ® AK 100 SILICONOEL | 5 | 2.03 | n/a | n/a | Inhomogeneous distribution, streaks about 100 μm |
| V2 | No additive | n/a | n/a | 0.5 | 149.6 | n/a |

These resins modified in accordance with the invention have an elevated K1c value compared to the unmodified phenol resin (determination analogous to the above description), which is a measure of improved toughness. The resins modified in accordance with the invention are more elastic and have a reduced Tg compared to the unmodified phenol resin.

Example 8

Production of Phenolic Resin-Coated Q-PANEL Test Sheets:

For the brittleness determination experiments, Q-PANEL test sheets were cleaned 3× with acetone on the brushed side and then flashed off in a fume hood for 1 h. Subsequently, 3 mL of the appropriate phenolic resin solution from example 6 were applied to each sheet and spread with a 100 μm coating bar, and then the solution was evaporated off in a fume hood overnight.

For hardening, the samples were placed into a cold drying cabinet, heated up to 160° C. while purging with nitrogen within 3 hours, kept at this temperature for 2 h and cooled down to 23° C. overnight.

The evaporation of the solvent gives rise to an about 50 μm-thick hardened resin layer on the sheet.

Example 9

Testing of Durability:

By means of a ball impact tester, it is possible to examine the stability of the coating in isolated form. A conclusion is obtained with regard to the elasticity, impact resistance and fracture resistance of a coating.

For detection of the improved properties, i.e. toughness and impact resistance to impacts and pressure, according to Examples 6 and 8, a hardened layer of the inventive resins from examples 1-5 of thickness about 50 μm in each case was produced on a Q-PANEL test sheet, or, as comparative examples, a hardened layer of the unmodified Resin 14772 (Plastics Engineering Company, Sheboygan, USA) of thickness about 50 μm and of the noninventive resin from comparative example V1. The coated sheets were tested in an Erichsen ball impact tester, model 304-ASTM, and the results were visually evaluated by a trained tester: for this purpose, a ball was allowed to fall from a defined, variable drop height onto the reverse side of the sheet (twin experiments in each case at different sites). The impact energy is found from the drop height multiplied by drop weight, reported in inches (in)×pounds (lbs). The impact energy is altered as follows: 5, 10, 15, 20, 25, 30, 35, 40 (in×lbs). The bulging impact sites were assessed visually for fissures and cracks and assessed relative to the reference.

Table 2 shows the assessment of the resin coating on Q-PANEL test sheets and the stability thereof by means of a ball impact tester.

TABLE 2

| Resin from example | Siloxane additive | Description of the coating | Impact test | Description |
|---|---|---|---|---|
| 1 | WACKER ®WAX OH 350 D-RO | very smooth, shiny | ++ | no cracking up to 40 in × lbs |
| 2 | SIPELL ® RE 63 F | smooth, shiny | + | cracking at 25 in × lbs |
| 3 | Silicone oil 1 | very smooth, shiny | ++ | cracking at 40 in × lbs |
| 4 | Silicone oil 2 | very smooth, shiny | + | cracking at 25 in × lbs |
| 5 | WACKER ®WAX OH 350 D-RO WACKER ® AK 100 SILICONOEL | very smooth, shiny | ++ | no cracking up to 40 in × lbs |
| V1 | WACKER ® AK 100 SILICONOEL | slightly rough, uneven | 0 | cracking from 5 in × lbs |
| V2 | No additive | slightly rough, uneven | 0 | cracking from 5 in × lbs |

The values should be understood as follows:

"0" means a cracking profile similar to the reference. The reference shows distinct cracking even at the lowest energy, from 5 in×lbs. The extent of cracking is similar to the reference.

"+" means a better cracking profile than the reference, meaning that distinct cracks are only apparent at a higher energy in the range of 10-30 in×lbs, or the extent of cracking is distinctly reduced overall compared to the reference.

"++" means that no cracks are apparent up to an energy of 30 in×lbs.

It is found, totally unexpectedly, that the coatings of the invention lead to smoother surfaces, whereas comparative example V1 that has been modified in a noninventive manner, even though it comprises a polysiloxane which is not in accordance with the invention, does not show this very advantageous effect. The cured coatings of the invention have significantly improved elasticity, impact resistance and fracture resistance compared to the unmodified comparative example V2 and to the noninventively modified comparative example V1. This is completely surprising since the prior art teaches that extrinsic impact modifiers are unsuitable for effectively improving the very brittle, vitreous reactive resins such as phenolic resins (Li Zhongatao; doctoral thesis from the year 2000, entitled: "High fracture toughness and high modules silicone resins" published at http://hdl.handle.net/1721.1/8301).

Example 10

Production of Coated Proppants:

20-40 mesh fracking sand was coated with 3.5% of the inventive resins from examples 1 and 5, or, as comparative examples, with 3.5% of the unmodified Resin 14772 (Plastics Engineering Company, Sheboygan, USA) and of the noninventive resin from comparative example V1 by a melting method and cured with 10% by weight of urotropin, based on the amount of resin.

Table 3 shows the evaluation of the quality of coating of fracking sand with modified resin from example 1 by means of an electron microscope (SEM).

TABLE 3

| | Comparative example V2 | Example 1 |
|---|---|---|
| Good coating | 81% | 87% |
| Moderately good coating | 16% | 11% |
| Poor coating | 3% | 2% |

It is found that the reactive resin composition of the invention brings about more uniform and more effective coating of the surface of the proppant.

Example 11

Study of Pressure Stability of Coated Proppants:

The pressure stability of the coated proppants according to example 8 was studied according to DIN EN ISO 13503-2 at pressure 14,000 PSI and 18,000 PSI. The result is shown in table 4.

TABLE 4

| Fracking sand coated with resin from example | Amount of fines formed in % | |
|---|---|---|
| | at 14000 PSI | at 18000 PSI |
| 1 | 7.4 | 12.1 |
| 4 | 8.4 | 15.1 |
| 5 | 7.5 | 12.7 |
| V1 | 12.9 | 19.8 |
| V2 | 10.3 | 15.9 |

It is found that, completely surprisingly, 20-30% less fines is formed in the case of the proppants coated in accordance with the invention compared to the proppants with unmodified coating. The improvement in the compressive strength of the proppants coated in accordance with the invention was completely unexpected, since an improvement in the fracture resistance and impact resistance of the reactive resins modified in accordance with the invention does not permit any fundamental conclusion that this automatically also leads to an improvement in compressive strength.

The invention claimed is:
1. A reactive resin composition, comprising:
(A) 80%-99.8% by weight of at least one reactive phenol novolac resin, and
(B) 0.2%-20% by weight of at least one linear or cyclic organopolysiloxane, wherein the weight percentages of (A) and (B) are based on the total weight of the reactive resin composition, and (C) optionally, a hardening agent, with the provisos that:

(B) has at least 3 successive Si—O units;

(B) has at least one Si—C-bonded, pendant or terminal organic $R^1$ radical, where $R^1$ contains at least 6 atoms independently selected from the group consisting of C, N, P, O and S, and at least 3 of these atoms in $R^1$ are C;

in (B) the ratio of the sum total of all carbon atoms to the sum total of all silicon atoms is at least 3;

(B) is in free-flowing form at 20° C., or is convertible to free-flowing form by heating to a temperature in a range of up to 250° C.; and in (B) when $R^1$ is polymeric, it is a polymer selected from the group consisting of polyethers, polycaprolactones, polyesters, polyvinyl acetates, polystyrenes, polymethylmethacrylates, and mixtures thereof.

2. The reactive resin composition of claim 1, wherein (B) has at least 5 successive Si—O units.

3. A process for preparing a reactive resin composition of claim 1, comprising dissolving and/or dispersing (B) in (A) wherein (B) is free-flowing at 20° C.; has been rendered free-flowing by prior heating up to 250° C.; or has been dissolved in a suitable solvent.

4. A coating, moulding, workpiece, or foam, comprising a cured reactive resin composition of claim 1.

5. A process for coating proppants, comprising applying a composition of claim 1 to proppant particles, and at least partially curing the composition.

6. A reactive resin composition, comprising:

(A) 80%-99.8% by weight of at least one reactive phenol novolac resin, and (B) 0.2%-20% by weight of at least one linear or cyclic organopolysiloxane, wherein the weight percentages of (A) and (B) are based on the total weight of the reactive resin composition, and (C) optionally a hardening agent, with the provisos that:

(B) has at least 3 successive Si—O units;

(B) has at least one Si—C-bonded, pendant or terminal organic $R^1$ radical, where $R^1$ contains at least 6 atoms independently selected from the group consisting of C, N, P, O and S, and at least 3 of these atoms in $R^1$ are C;

in (B) the ratio of the sum total of all carbon atoms to the sum total of all silicon atoms is at least 3;

(B) is in free-flowing form at 20° C., or is convertible to free-flowing form by heating to a temperature in a range of up to 250° C.; and wherein at least one $R^1$ comprises an epoxy radical; an amino radical of the formula $$—R^6—[NR^7—R^8—]_nNR^7{}_2 \quad \text{(VIII)}$$

where $R^6$ is a divalent linear or branched hydrocarbyl radical having 3 to 18 carbon atoms, $R^7$ is a hydrogen atom, an alkyl radical having 1 to 8 carbon atoms or an acyl radical, $R^8$ is a divalent hydrocarbyl radical having 1 to 6 carbon atoms, n is 0, 1, 2, 3 or 4; or a carboxyalkyl radical.

7. The reactive resin composition of claim 1, which when hardened has a K1c of at least 0.55 MN/m$^{3/2}$.

* * * * *